United States Patent

Tsubaki et al.

[11] Patent Number: 5,815,138
[45] Date of Patent: Sep. 29, 1998

[54] METHOD AND APPARATUS FOR CONTROLLING A CURSOR

[75] Inventors: Hisayoshi Tsubaki; Norihisa Haneda, both of Asaka, Japan

[73] Assignee: Fuji Photo Film Co., Ltd., Kanagawa, Japan

[21] Appl. No.: 499,075

[22] Filed: Jul. 6, 1995

Related U.S. Application Data

[63] Continuation of Ser. No. 134,690, Oct. 12, 1993, abandoned.

[30] Foreign Application Priority Data

Oct. 16, 1992 [JP] Japan .................................. 4-278574

[51] Int. Cl.$^6$ ........................................................ G09G 5/08
[52] U.S. Cl. ........................................ 345/145; 345/157
[58] Field of Search .................................. 345/145, 146, 345/157, 159, 163, 161, 115

[56] References Cited

U.S. PATENT DOCUMENTS

| | | | |
|---|---|---|---|
| 4,698,625 | 10/1987 | McCaskill et al. | 345/157 |
| 4,987,411 | 1/1991 | Ishigami | 345/157 |
| 5,198,802 | 3/1993 | Bertram et al. | 345/146 |
| 5,298,890 | 3/1994 | Kanamaru et al. | 345/157 |

FOREIGN PATENT DOCUMENTS 390041A 10/1990 European Pat. Off. ............... 345/146

*Primary Examiner*—Chanh Nguyen

[57] ABSTRACT

In a method and a device for moving a cursor on a display or similar screen to point to one of a plurality of selectable areas displayed on the display, data recorded in a data recording medium is read, and coordinates of the position of the selected area are identified on the basis of the data thus read. In response to a signal by holding an inputting device, a direction in which the inputting device is manipulated is detected and direction data is output. Coordinates of the position of the cursor are updated by replacing them with the coordinates of the position of the selected area located in the direction detected. The image data of the cursor is generated on the basis of the coordinates of the position of the cursor and updated. The image data for displaying is processed to display the image data.

13 Claims, 6 Drawing Sheets

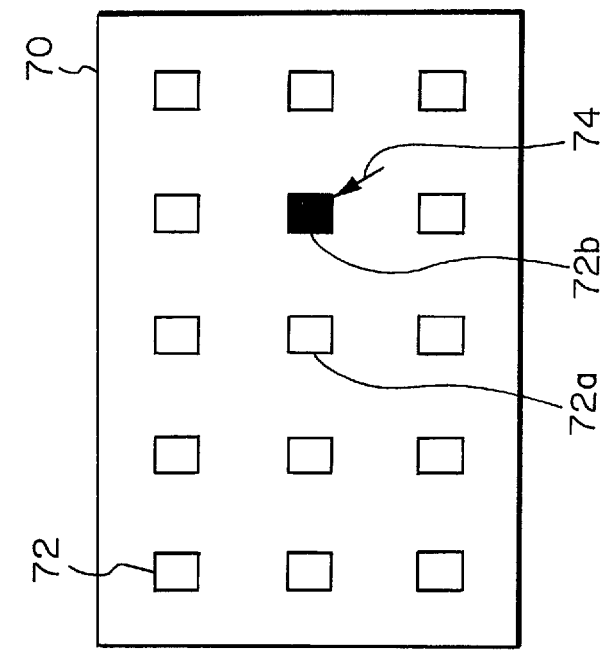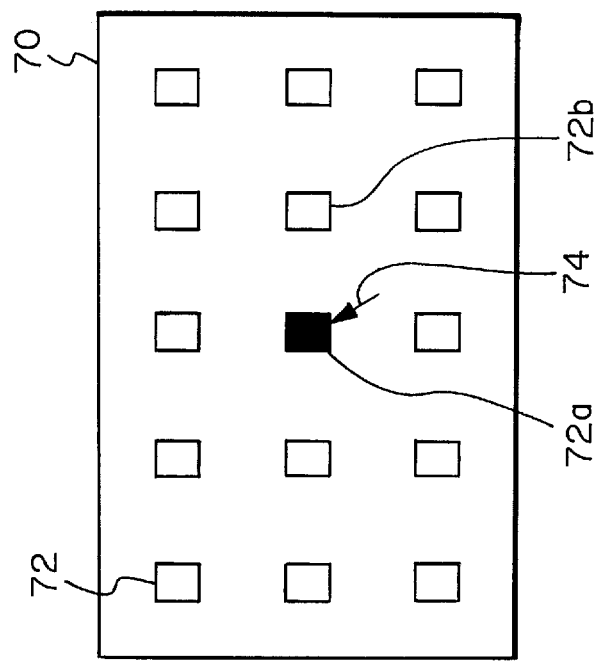

METHOD AND APPARATUS FOR CONTROLLING A CURSOR

This application is a continuation of application Ser. No. 08/134,690 filed on Oct. 12, 1993, now abandoned.

BACKGROUND OF THE INVENTION

1. Field of the Invention

The present invention relates to equipment for displaying images on a display or similar screen with a computer or similar image processing device and, more particularly, to a method and an apparatus for moving a cursor appearing on a screen.

2. Description of the Related Art

Recent rapid strides in computer technology have implemented image data processing which allows a huge volume of data, e.g., image data to be handled by a personal computer or similar processing device. With a CD-I (Compact Disc-Interactive) player, for example, the user can deal with a volume of image data easily. Specifically, a CD-I player is operable with, for example, a CD-I disk storing a great amount of image data together with an application program. This kind of player allows the user, watching an ordinary television (TV) receiver for home use, to search for a desired image file out of such a volume of image data on the basis of the application program and to appreciate or even to play a game with an image represented by the image file. A photo CD system is another recent achievement in the imaging art. In a photo CD system, a series of still pictures recorded on 35 millimeter film by a camera is read out and then written to a writable compact disk (CD-R) as image data. A photo CD player or similar reproducing equipment is used to reproduce the image data representative of a desired picture out of the CD-R disk and show it on a display, e.g., a home TV receiver.

When the CD-I player or the photo CD player is operated to reproduce desired image data out of the disk, icons or similar function buttons appear on the screen to urge the user to search for and select the desired image data. The user manipulates a mouse, joystick or similar conventional pointing device to move a cursor to one of the function buttons representative of a desired function on the screen and then selects the function.

However, with the pointing device of this type it is difficult for the user to move the cursor accurately to the position where the desired button is located. Particularly, when a still picture is displayed on a home TV receiver or similar display, the function buttons should preferably have as small a size as possible in order to allocate as broad an area as possible to the picture. This makes it more difficult to put the cursor on the button with accuracy and often causes the pointing device to send an undesired command to the player or causes the player to reject a command from the pointing device. Locating the cursor on such a small function button with accuracy is especially difficult when use is made of a joystick having four or eight switches for detecting the operator's manipulation performed in four or eight directions. To eliminate this problem, the displacement of the cursor associated with the operator's manipulation may be made small enough to promote accurate cursor movement. This kind of approach, however, needs much time in moving the cursor to a desired position over the broad area on the screen, preventing efficient manipulation.

SUMMARY OF THE INVENTION

It is, therefore, an object of the present invention to provide a method and an apparatus for controlling the movement of a cursor in such a manner as to promote easy and accurate selection of a function button out of a plurality of function buttons appearing on a screen.

In accordance with the present invention, a cursor control apparatus for reading data out of a data recording medium, displaying an image represented by the data on a display, and generating, in response to an output signal inputted by holding an inputting device (the output signal being representative of operator's manipulation of the inputting device), image data representative of a cursor and the plurality of function buttons for selecting, on the display, an area therefrom. The cursor control apparatus includes a control circuit for generating image data representative of the selectable area of the image and image data representative of the cursor, and a displaying section for executing processing for causing the image data generated by the control circuit to appear on the display. The control circuit comprises a direction detecting section for detecting, in response to a signal representative of the operator's manipulation of the inputting device, a direction in which the inputting device is manipulated, a reading section for reading the data recorded in the data recording medium, a coordinates identifying section for identifying coordinates representative of the position of the selectable area on the basis of the data read by the reading section, a deciding section for updating coordinates representative of the position of the cursor by replacing the coordinates with the coordinates representative of the position of the selectable area located in the direction detected by the direction detecting section, and a cursor displaying section for generating image data representative of the cursor on the basis of the coordinates representative of the position of the cursor as updated by the deciding section.

In accordance with the present invention, there is provided a cursor control method for reading data out of a data recording medium, displaying an image represented by the data on a display, and generating, in response to an output signal of an inputting device representative of the operator's manipulation of the inputting device, image data. The image data is representative of a cursor for pointing, on the display, to one area out of a plurality of selectable areas. The cursor control method comprises the steps of: (a) reading the data recorded in the data recording medium; (b) identifying coordinates representative of the positions of the selectable areas on the basis of the data read in the step (a); (c) detecting, in response to a signal inputted by the inputting device, a direction in which the inputting device is manipulated; (d) updating coordinates representative of the position of the cursor by replacing them with the coordinates representative of the position of a selectable area which is located in the direction detected in the step (c); and (e) generating image data representative of the cursor on the basis of the coordinates representative of the position of the cursor as updated in the step (d).

BRIEF DESCRIPTION OF THE DRAWINGS

The objects and features of the present invention will become more apparent from the consideration of the following detailed description taken in conjunction with the accompanying drawings in which:

FIGS. 4A, 4B, 5A and 5B each shows a specific image reproduced by the embodiment on a screen.

DESCRIPTION OF THE PREFERRED EMBODIMENT

Figure 2:
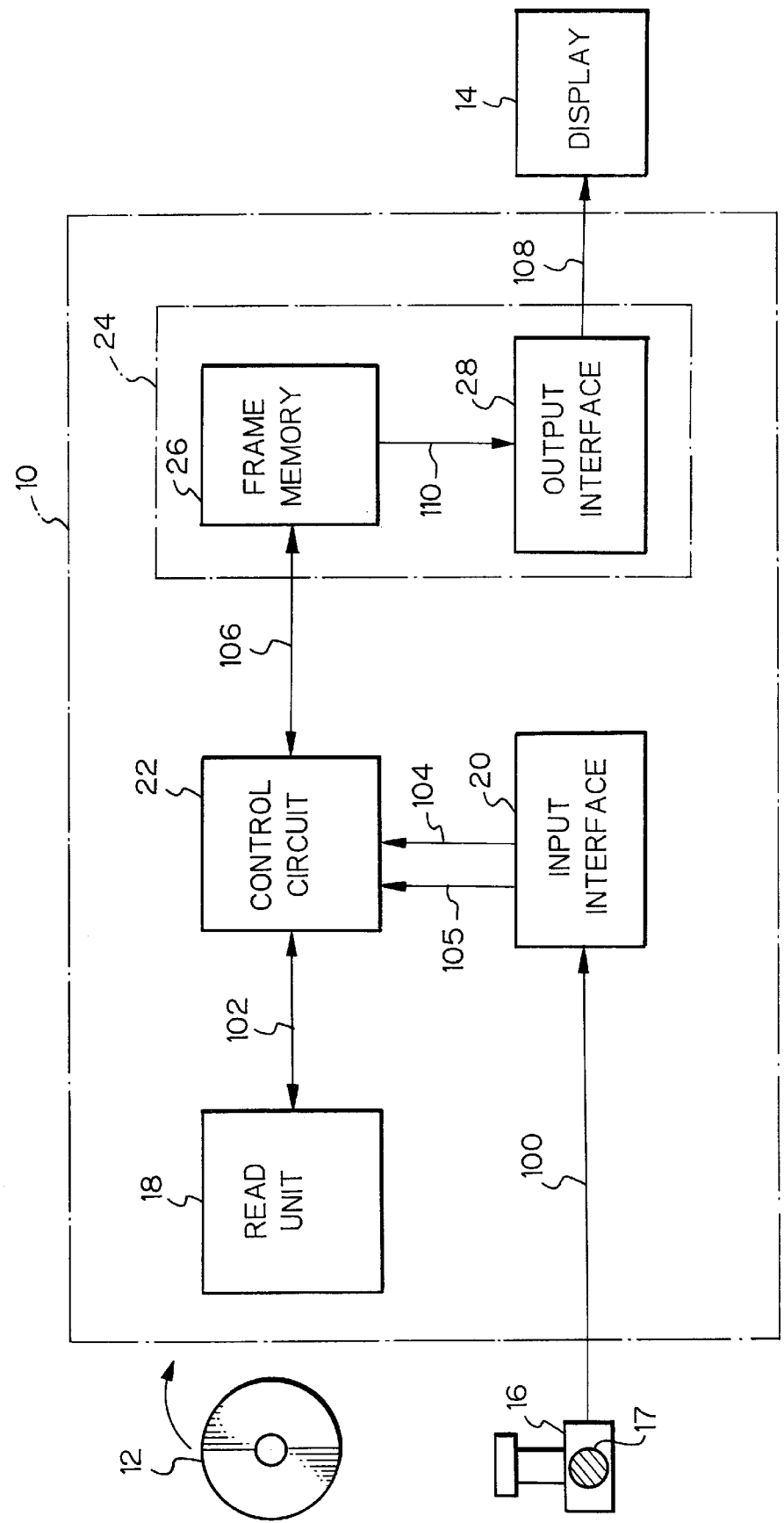
FIG. 2 is a schematic block diagram showing a CD-I player implemented with the embodiment of the present invention.

Referring to FIG. 2 of the drawings, a CD-I player implemented with a cursor control apparatus embodying the present invention is shown and generally designated by the reference numeral 10. As shown, the CD-I player 10 is loaded with a disk 12 which, based on a photo CD standard by way of example, stores image data representative of still pictures together with control data associated therewith. The player 10 reads image data representative of desired one of the still pictures out of the disk 12 and shows the picture on a display 14, e.g., a TV receiver for home use. A pointing device in the form of a joy stick 16 is connected to the player 10. Assume a condition wherein icons or similar function buttons are shown on the display 14 together with a cursor. Then, the operator, or user, of the player 10 may move the cursor to a desired one of the function buttons and select it by manipulating the joystick 16 on the basis of the control data stored in the disk 12. This allows the operator to search the image data stored in the disk 12 and see a desired still picture or see multiple still pictures one after another on the display 14. It is to be noted that parts of the player 10 which are not relevant to the understanding of the present invention are not shown or described, and that signals are designated by the same reference numerals as connection lines on which they are propagated.

Specifically, the CD-I player 10 includes a reading unit 18 for reading the image data and control data out of the disk, or data recording medium, 12 when the disk 12 is loaded thereon. An input interface 20 receives manipulation data representative of the operator's manipulation of the joystick, or pointing device, 16 connected thereto. The manipulation data is transferred from the input interface 20 to a control circuit 22. On detecting the manipulation data, the control circuit 22 controls the read-out of the image data and control data out of the disk 12 loaded on the reading unit 18. At the same time, the control circuit 22 transforms the format of the image data to a format feasible for display and delivers the resulting image data to a display circuit 24. The display circuit 24 executes signal processing for displaying a still picture represented by the image data on the display 14. Specifically, the display circuit 24 has a frame memory 26 capable of storing one frame of image data to be displayed on the display 14, and an output interface 28 for converting the image data to a video signal and sending the video signal to the display 14.

Figure 3:
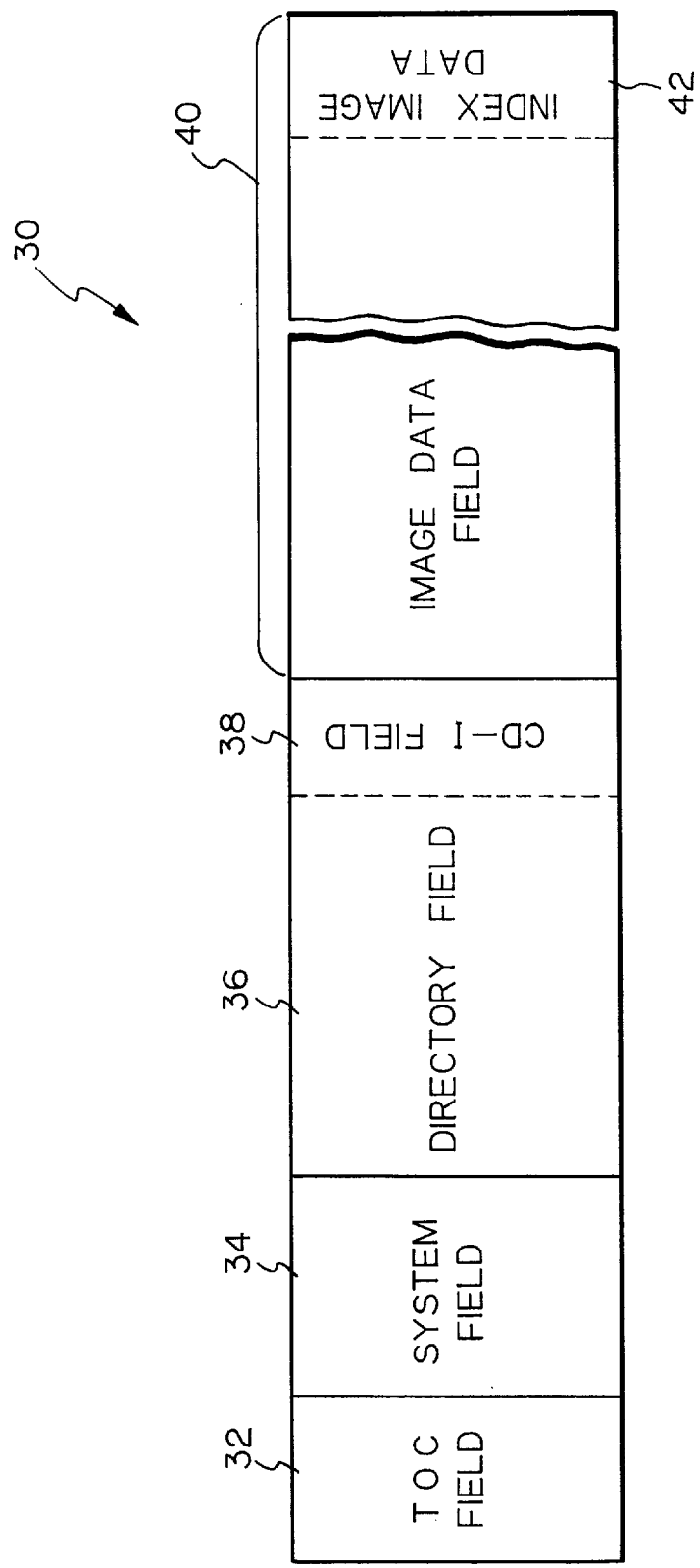
FIG. 3 shows a specific format of a storage area formed in a disk with which the embodiment is practicable.

The disk 12 to be played by the CD-I player 10 will be described hereinafter. The disk 12 is implemented as a WORM (Write Once, Read Many time) optical disk by way of example. As shown in FIG. 3, the disk 12 has a storage area 30 divided into a plurality of fields each being assigned to a particular kind of data. For example, the storage area 30 is made up of a TOC (Table Of Contents) field 32, a system field 34 and a directory field 36 each of which store control data, and an image data field 40 storing image data representative of still pictures. The directory field 36 includes a CD-I field 38 storing a CD-I application program, i.e., a control program for implementing the reproduction of the image data recorded in the image data field 40. Particularly, in the illustrative embodiment, the CD-I field 38 stores: image data representative of the function buttons, as distinguished from the image data representative of the still pictures, to appear on the display 14 (FIG. 2) data representative of the coordinates of the function buttons on the display 14; data representative of the functions particular to the function buttons; and data representative of the initial position of the cursor. After a power switch (not shown), provided on the player 10, has been turned on and the disk 12 has been loaded on the player 10, the various control data stored in the CD-I field 38 are read out by the player 10 upon the start-up of the player 10. On the other hand, the image data field 40 stores, at the trailing end thereof, index image data 42 representative of an index image in which all the still pictures stored in the image data field 40 are listed in a reduced scale to be seen at a glance.

Referring again to FIG. 2, the joystick 16 plays the role of an inputting device for sending to the CD-I player 10 data for moving the cursor appearing on the display 14 to a position where a desired function button is located. The joystick 16 may be made up of a stick member for moving the cursor on the display 14, and a plurality of switches for detecting the direction in which the stick member is tilted by the operator. The output of the joystick 16 representative of the operator's manipulation (i.e., the ON/OFF state of each switch) is delivered to the input interface 20 of the player 10 over a line 100. For example, when the stick member is tilted to the front, rear, right or left, one of the switches toward which the stick member is tilted is turned on. Further, the joystick 16 is provided with a select switch 17 for selecting the function button pointed by the cursor. As the operator turns on the select switch 17 after locating the cursor at a desired function button, a select signal for selecting the button is sent from the joystick 16 to the input interface 20 over the line 100. When the inputting device is implemented as a mouse or a trackball in place of the joystick 16, the mouse or the trackball must be moved to output a pulse signal representative of, for example, the direction and speed of an operator's manipulation.

The reading unit 18 of the CD-I player 10 is a photo CD drive which causes the disk 12 loaded thereon to spin and reads the data stored in the disk 12 with a laser beam. The output 102 of the reading unit 18 is connected to the control circuit 22. Under the control of the control circuit 22, the reading unit 18 emits a laser beam onto the surface of the disk 12 and detects the resulting reflections from pits formed in the disk 12, thereby reading the image data and control data out of the disk 12. Specifically, when the disk 12 is loaded on the reading unit 18, the unit 18 detects it and causes it to spin. Then, the reading unit 18 sequentially reads the control data stored in the TOC field 32, system field 34 and directory field 36 of the disk 12 while sending them to the control circuit 22 via the output 102 thereof. Also, the reading unit 18 reads the image data out of the image data field 40 of the disk 12 under the control of the control circuit 22.

As the input interface 20 detects, for example, an ON signal indicative of the turn-on of one of the switches of the joystick 16, it delivers data representative of the duration of the ON signal to the control circuit 22. Specifically, the input interface 20 generates data representative of a direction indicated by the ON signal and, at the same time, counts the duration of the ON signal so as to generate duration data. These data appear on one output 104 of the input interface 20. Further, on detecting the select signal associated with the select switch 17 of the joystick 16, the input interface 20 produces the select signal on the other output 105 thereof.

The outputs 104 and 105 are connected to the control circuit 22. A mouse, trackball, keyboard or similar inputting device other than the joystick 16 may be connected to the input interface 20. In such a case, the interface 20 will detect a pulse signal or a character code representative of the operator's manipulation of the inputting device and generate data representative of a direction indicated by the signal or the code.

The control circuit 22 controls the various sections constituting the CD-I player 10. In the illustrative embodiment, the control circuit 22 may advantageously be implemented by a microprocessor. The control circuit 22 reads the image data and control data out of the disk 12 by controlling the reading unit 18 and changes the format of the image data to a format suitable for display. The resulting data are sent from the control circuit 22 to the display circuit 24 over the line 106. The control circuit 22 also has a function of causing the function buttons and cursor to appear on the display 14 on the basis of the control data read out of the disk 12. The function buttons each defines respective area representative of a particular function, while the cursor allows the operator to select a desired one of the function buttons. On receiving the data representative of the manipulation of the joystick 16 from the input interface 20, the control circuit 22 moves the cursor to the corresponding function button on the display 14. Assume that the control circuit 22 has received the select signal representative of the turning-on of the select switch 17 of the joystick 16 via the input interface 20 while the cursor is located at a desired function button. Then, the control circuit 22 executes a function represented by the function button on the basis of function data which is included in the control data read out of the CD-I field 38 of the disk 12 and defines the function of the button. For example, assume that the control circuit 22 has read out of the disk 12 function data indicating that the function buttons each corresponds to a particular still picture stored in the disk 12. Then, on detecting the select signal from the input interface 20, the control circuit 22 causes image data corresponding to the function button pointed to by the cursor to be read out.

The control circuit 22 will be described more specifically with reference to FIG. 1. As shown, the control circuit 22 is made up of a reading section 50, a coordinates identifying section 52, a direction detecting section 54, a deciding section 56, a cursor displaying section 58, and a displaying section 60. The reading section 50 drives the reading unit 18 to read the data stored in the disk 12. Specifically, the reading section 50 reads the image data stored in the image data field 40, and the data stored in the CD-I field 38 which are representative of the images of the function buttons, while delivering this data to the displaying section 52. At the same time, the reading section 50 reads out of the CD-I field 38 data indicative of the positions of the function buttons and data indicative of the initial position of the cursor, while delivering this data to the coordinates identifying section 54.

On receiving the data from the reading section 50, the coordinates identifying section 52 determines the coordinates of each of the function buttons to be displayed on the display 14. Specifically, the identifying section 52 generates coordinates data representative of such coordinates and delivers them to the deciding section 56. At the same time, the coordinates identifying section transforms the data representative of the initial value of the cursor position to position data representative of a cursor position on the display 14. The position data is also delivered to the deciding section 56.

The data indicative of the operator's manipulation of the joy stick 16 is fed from the input interface 20 to the direction detecting section 54. In response, the direction detecting section 54 determines the direction in which the cursor should be moved on the display 14. Specifically, the direction detecting section 54 detects a vector representative of a direction for moving the cursor out of the input data, generates direction data based on the vector, and then delivers it to the deciding section 56.

The deciding section 56 determines a direction for moving the cursor on the display 14 in response to the coordinates data fed from the coordinates identifying section 52 and the direction data fed from the direction detecting section 54. Specifically, the deciding section 56 determines whether or not the direction data from the direction detecting section 54 is valid by referencing the coordinates data representative of the coordinates of the function buttons and the current cursor position which are fed from the coordinates identifying section 52. More specifically, the deciding section 56 produces, by using the current cursor position data as a reference, coordinates data in the direction indicated by the direction data by calculation. Then, the deciding section 56 compares the calculated coordinates data with the coordinates data representative of the coordinates of the function buttons. If the former coordinates data is coincident with or approximate to any one of the latter coordinates data, the deciding section 56 updates the position data representative of a cursor position by replacing it with a value representative of the coordinates of the function button of interest. If the calculated coordinates data includes a plurality of function buttons, the deciding section 56 selects one of the function buttons closest to the current cursor position and then replaces the cursor position data with a value representative of the coordinates of the function button selected. Further, if the coordinates data in the direction indicated by the direction data is not coincident with or approximate to any one of the coordinates of the function buttons, the deciding section 56 invalidates the direction data fed from the direction detecting section 54 and does not change the position data representative of the current cursor position. The deciding section 56 delivers the position data updated or left unchanged as stated above to the cursor displaying section 58.

On receiving the data representative of the cursor position on the screen, i.e., display 14 from the deciding section 56, the cursor displaying section 58 generates cursor data for displaying the cursor at the designated position on the display 14. The cursor data is applied from the cursor displaying section 58 to the displaying section 60. The cursor data may indicate the shape, including size, and color of the cursor in addition to the position of the cursor on the display 14.

The displaying section 60 converts the image data read by the reading section 50 to display data having a format suitable for display. Also, the displaying section 60 has a function of combining the data representative of the function buttons with the display data. The resulting composite data are applied to the frame memory 26 of the display circuit 24, FIG. 2, connected to the output 106 of the displaying section 60. As a result, the composite data to be displayed are stored in the frame memory 26. Another function of the displaying section 60 is to further combine the cursor data fed from the cursor displaying section 58 with the combined display data and function button data stored in the frame memory 26. With this function, the displaying section 60 is capable of showing the cursor on or in the vicinity of any one of the function buttons appearing on the display 14.

Figure 1:
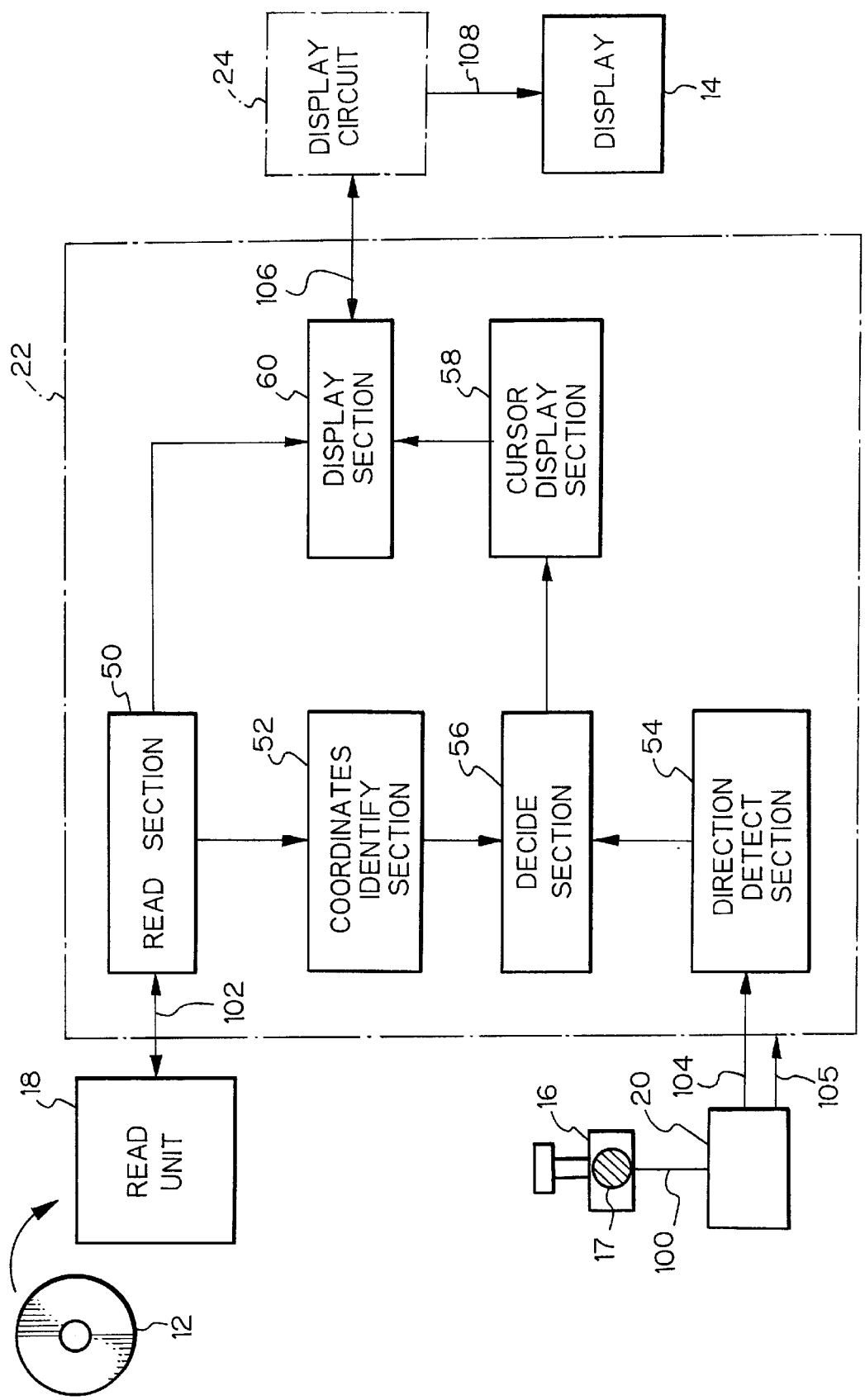
FIG. 1 is a block diagram schematically showing a preferred embodiment of the apparatus for controlling a cursor on a screen in accordance with the present invention.

The frame memory 26 of the display circuit 24 shown in FIG. 1 is capable of storing image data representative of a single frame of still picture. The frame memory 26 stores the display data transferred from the output 106 of the control circuit 22 under the control of the control circuit 22. On receiving the cursor data, the frame memory 26 combines it with the display data stored therein, also under the control of the control circuit 22. The frame memory 26 repetitively delivers one frame of display data to the output interface 28 via the output 110 thereof. The output interface 28 transforms the display data stored in the frame memory 26 to a particular signal format matching the display 14. For example, the output interface 28 transforms digital display data fed from the frame memory 26 to a video signal of NTSC (National Television System Committee) format. The video signal is fed from the output interface 28 to the display 14 over a line 108. The display 14 displays a picture represented by the video signal and may be implemented as a CRT (Cathode Ray Tube) display by way of example.

Referring to FIGS. 4A, 4B, 5A and 5B, there are shown specific pictures which may selectively appear on a screen 70 provided on the display 14. As shown in FIG. 4A, a picture showing set of function buttons 72 appears on the screen 70 of the display 14 on the basis of the control data recorded in the CD-I field 38 of the disk 12. The function buttons 72 allow the operator or viewer to select, for example, a desired still picture to be displayed on the screen 70. In the specific condition shown in FIG. 4A, a cursor 74 is shown as pointing to a function button 72a. If desired, the index image or picture represented by the index image data 42, FIG. 3, may be displayed on the screen 70 to allow the operator to see all the frames of still pictures stored in the image data field 40, FIG. 3, at a glance. In such a case, the function buttons 72 may each be matched to a particular still picture.

Figure 5A:
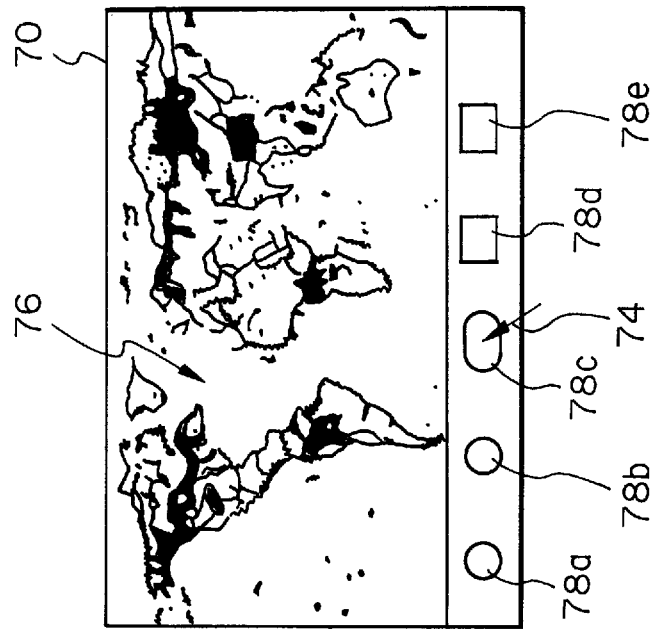
Figure 5B:
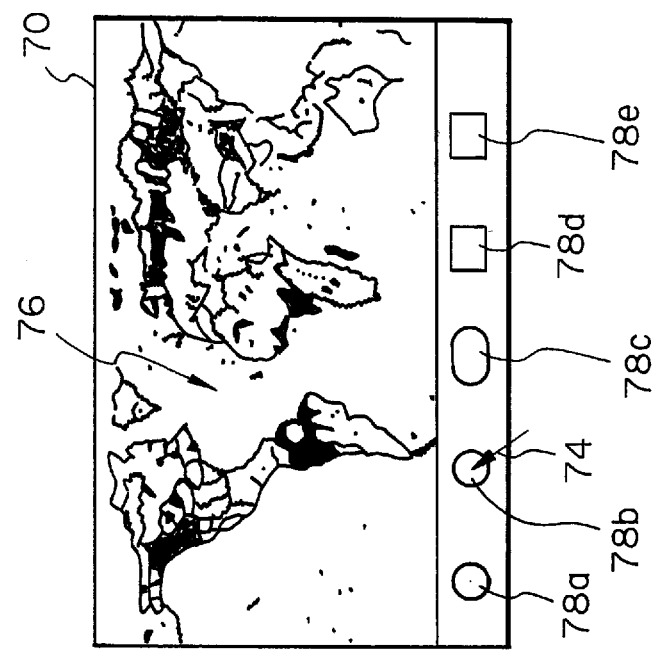

FIG. 5A shows a picture appearing on the screen 70 of the display 14 when a button 72b shown in FIG. 4A is selected. As shown, a reproduced picture 76 derived from the image data and the control data stored in the image data field 40 and the CD-I field 38, respectively, is displayed on the screen 70. At the same time, function buttons 78a, 78b, 78c, 78d and 78e are displayed below the picture 76. On the screen 70 of FIG. 5A, the cursor 74 is shown as pointing the function button 78b. The function buttons 78a–78e are each used to, for example, see a picture preceding or following the picture 76 appearing on the screen 70 or to see the previously mentioned index picture.

Figure 6:
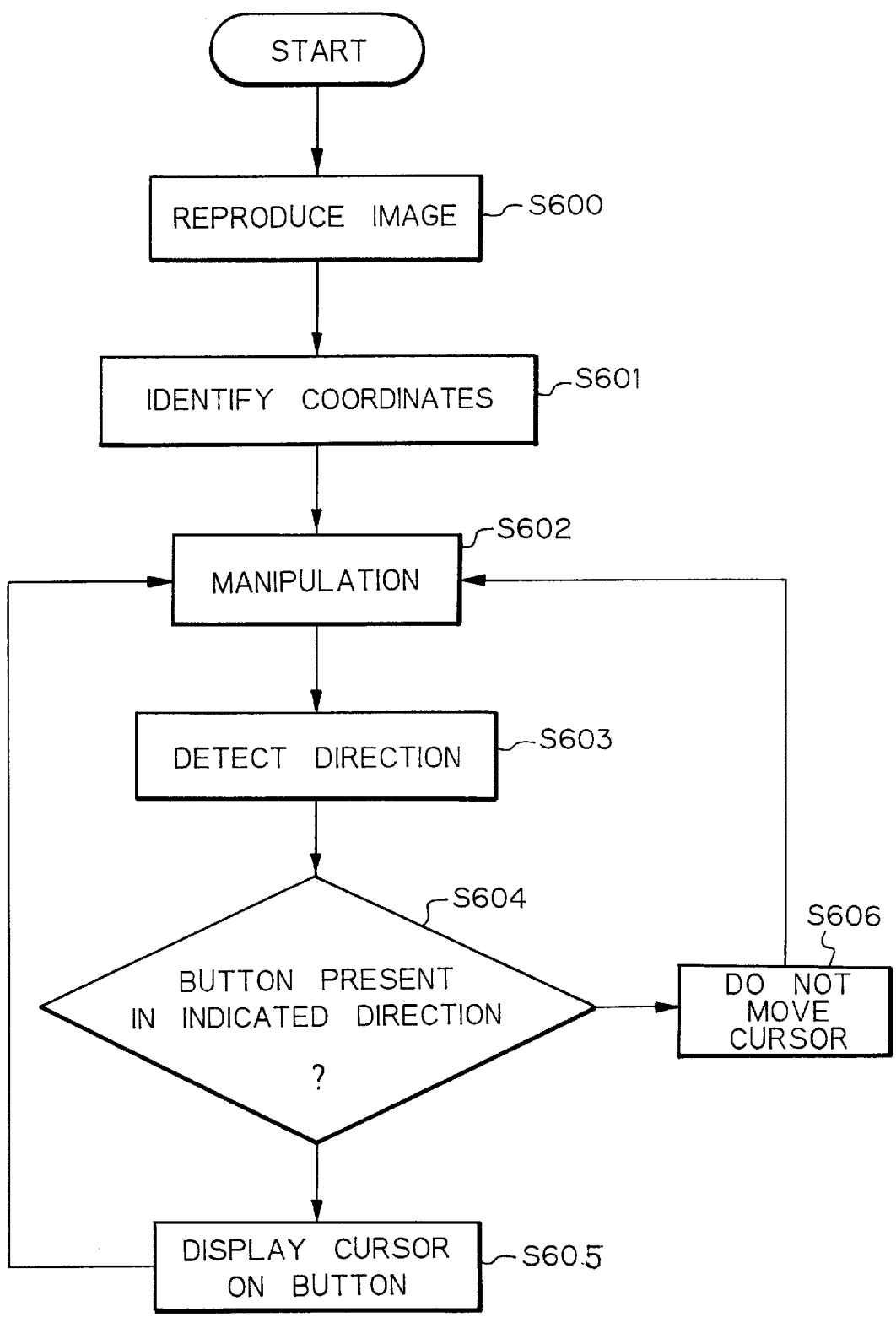
FIG. 6 is a flowchart demonstrating a specific operation of a control circuit included in the embodiment.

A specific operation of the CD-I player 10, i.e., the control circuit 22 having the above construction will be described with reference to FIG. 6 as well as to FIGS. 4A–5B. When the disk 12 is loaded on the CD-I player 10, the control circuit 22 detects it. Then, the reading section 50 of the control circuit 22 reads the control data out of the TOC field 32, system field 34 and directory field 36 of the disk 12 by controlling the reading unit 18. The image data representative of the images of the function buttons and included in the control data are transferred from the reading section 50 to the displaying section 60. In response, the displaying section 60 transforms the image data to display data suitable for display and delivers the display data to the display circuit 24 over the line 106. The display data representative of one frame of picture are written to the frame memory 26 of the display circuit 24. The display data are transferred from the frame memory 26 to the output interface 28 over the line 110. The output interface 28 converts the display data to, for example, an NTSC video signal. Consequently, as shown in FIG. 4A, the function buttons 72 represented by the display data appear on the display 14 which is connected to the output 108 of the output interface 28.

Data indicative of the positions of the function buttons 72 and data indicative of the position of the cursor 74 are also included in the control data and fed from the reading section 50 to the coordinates identifying section 52. The coordinates identifying section 52 converts the data relating to the cursor 74 to position data for displaying a cursor position on the screen 70. This position data is routed through the deciding section 56 to the cursor displaying section 58. In response, the cursor displaying section 58 generates cursor data representative of the position of the cursor 74 on the screen 70 as well as the shape, including size, and color of the cursor 74. The cursor data are delivered to the displaying section 60. The displaying section 60 combines the cursor data with the image data representative of the images of the function buttons 72 and then converts the composite data to display data suitable for display. The display data are transferred to the display circuit 24 over the line 106. In the display circuit 24, the display data, including the cursor data, are written to the frame memory 26. Subsequently, the display data are converted to an NTSC video signal. As a result, the cursor 74 appears on the screen 70 of the display 14 and points to the function button 72a, as shown in FIG. 4A. The procedure described so far is collectively represented by a step S600 in FIG. 6.

Subsequently, the coordinates identifying section 52, which receives the data indicative of the positions of the function buttons 72, generates coordinates data representative of the coordinates of the function buttons 72, on the screen 70 (step S601). The coordinates data are delivered from the coordinates identifying section 52 to the deciding section 56.

As the joystick 16 is manipulated by the operator (step S602), data representative of the operator's manipulation is sent from the joystick 16 to the direction detecting section 54 via the input interface 20. In response, the direction detecting section 54 detects a component, or vector, indicative of a direction for moving the cursor 74 on the screen 70 out of the data received from the input interface 20. Then, the direction detecting section 54 generates direction data representative of the direction component. This part of the operation is represented by a step S603 in FIG. 6. The direction data is also delivered to the deciding section 56.

As stated above, the deciding section 56 receives the coordinates data representative of the function buttons 72 on the screen 70 and the direction data representative of a direction for moving the cursor 74. In response, the deciding section 56 determines, by referencing the current position of the cursor 74, a position on the screen 70 where the cursor 74 should be displayed. Specifically, by using the position of the cursor 74 on the screen 70 represented by the position data as a reference, the deciding section 56 determines coordinates on the screen 70 which are indicated by the direction data. Subsequently, the deciding section 56 determines whether or not the coordinates data is coincident with or approximate to any one of the coordinates data associated with the function buttons 72 (step S604). If the former coordinates data is identical or approximate to any one of the latter coordinates data (YES, step S604), the deciding section 56 determines that the direction data is valid. Then, the deciding section 56 updates the position data representative of the position of the cursor 74 by replacing it with the data representative of the coordinates of the function button of interest. Assume that two or more of the coordinates data associated with the function buttons 72 are coincident with the coordinates data indicated by the direction data. Then, the deciding section 56 selects the function button closest to the current position of the cursor 74 and replaces the position data with the coordinates data representative of the function button selected. This is followed by a step S605.

In the step S605, the position data of the cursor 74 updated by the deciding section 56 is applied to the cursor displaying section 58. In response, the cursor displaying section 58 generates cursor data based on the position data. The cursor data is combined with the display data stored in the frame memory 26. The combined display data and cursor data are converted to an NTSC video signal by the output interface 28 and then output to the display 14. As a result, as shown in FIG. 4B, the cursor 74 appears at a position where it points to a function button 72b on the screen 70 of the display 14. Then, the program returns from the step S605 to the step S602 and awaits the next manipulation of the joy stick 16. Thereafter, the loop consisting of the steps S602–S605 is repeated to sequentially shift the cursor 74 on the screen 70 in response to the manipulation of the joy stick 16.

Assume that the coordinates data indicated by the direction data is not coincident with or approximate to any one of the coordinates data representative of the coordinates of the function buttons 72 (NO, step S604). Then, the deciding section 56 maintains the current position data of the cursor 74 and delivers such position data to the cursor displaying section 58. In response, the cursor displaying section 58 generates corresponding cursor data. This cursor data is combined with the display data stored in the frame memory 26. The combined display data and cursor data are converted to an NTSC video signal by the output interface 28 and then output to the display 14. Consequently, the cursor 74 pointing the function button 72a, as shown in FIG. 4A, does not move. This part of the operation is represented by a step S606 in FIG. 6.

After the cursor 74 has moved to the position adjoining the desired function button 72b (step S605), the operator operates the select switch 17 of the joy stick 16. Then, the joy stick 16 sends a select signal to the control circuit 22 via the input interface 20. In response, the control circuit 22 reads image data corresponding to the function button 72b pointed by the cursor 74 out of the image data field 40 of the disk 12. As a result, a picture 76 (shown in FIG. 5A), appears on the screen 70 of the display 14.

As described above, the control circuit 22 of the CD-I player 22 moves the cursor 74 to a desired one of the function buttons 72 on the screen 70 of the display 14 on the basis of the control data read out of the CD-I field 38 of the disk 12. Specifically, the direction detecting section 54 generates direction data indicative of a direction for moving the cursor 74 in response to data representative of the operator's manipulation of the joy stick 16. The deciding section 56 receives coordinates data representative of the coordinates of the function buttons 72 and data representative of the initial position of the cursor 74 from the coordinates identifying section 52. By using the initial position data of the cursor 74 as a reference, the deciding section 56 calculates coordinates in the direction indicated by the direction data. When data representative of the calculated coordinates is coincident or approximate to the coordinates data of any one of the function buttons 72, the deciding section 56 replaces the position data of the cursor 74 with a value equal to a value representative of the coordinates of the coincident function button 72. The cursor displaying section 58 transforms the updated position data of the cursor 74 to cursor data representative of the cursor 74 to appear on the screen 70 of the display 14. The cursor data is combined with display data and then displayed on the screen 70. The control circuit 22, therefore, causes the cursor 74 to appear only on a desired one of the function buttons 72. Hence, when no function buttons 72 are present in the direction in which the joy stick 16 is tilted, the manipulation of the joy stick 16 is determined invalid. This prevents the cursor 74 from moving to the area on the screen 70 where the function buttons 72 are absent, thereby promoting easy and efficient operation. When multiple function buttons are arranged over substantially the entire screen 70, the cursor 74 can be moved to a position for pointing to a desired function button rapidly. Further, even when multiple small function buttons are arranged only in a part of the screen 70, the cursor 74 can be located at a desired function button with accuracy. As a result, easy and efficient operation is further enhanced.

As shown in FIG. 5A, when the function buttons 78a–78e are arranged in a horizontal array on the screen 70, the cursor 74 is movable only in the horizontal direction parallel to the array of function buttons and displayed only on the function buttons. This prevents the cursor 74 from appearing on the picture 76 reproduced from the image data read out of the image data field 40 of the disk 12. The viewer, therefore, can enjoy viewing the picture 76 on the screen 70 without being annoyed by the cursor 76. In addition, it is not necessary for the viewer to search for the cursor 74 on a screen 70 having a broad area, since the cursor 74 does not appear on the reproduced picture 76.

In summary, in accordance with the present invention, a direction detecting section detects a direction in which an inputting device is manipulated. A deciding section detects a selectable area located in the direction detected by the direction detecting section. Further, the deciding section updates coordinates representative of the position of a cursor by replacing it with coordinates representative of the detected selectable area. A cursor displaying section generates image data representative of the cursor on the basis of the updated coordinates. Therefore, the cursor is displayed only on or in the vicinity of selectable areas appearing on a display, i.e., it is not displayed in areas other than the selectable areas. Accordingly it follows that the cursor can be moved to a desired selectable area easily and accurately. This is especially true when the selectable areas appearing on the display are small.

While the present invention has been described with reference to the particular illustrative embodiment, it is not to be restricted by the embodiment; rather, the scope of the invention is as defined by the appended claims. It is to be appreciated that those skilled in the art can change or modify the embodiment without departing from the scope and spirit of the present invention. For example, when no function buttons exist in the direction in which the joy stick 16 is manipulated, the illustrative embodiment practically invalidates the manipulation and does not move the cursor at all. Alternatively, an arrangement may be made such that, when the joy stick 16 is tilted to the left while the cursor 74 is pointing to the leftmost function button 78a on the screen 70 (as in FIGS. 5A and 5B), the cursor 74 appears on the rightmost function button 78e. Specifically, assume that the coordinates data in the direction indicated by the direction data is not coincident or approximate to the data representative of the function buttons 78, that the former data is coincident with the latter data which are located in the direction 180 degrees opposite to the direction indicated by the direction data, and that the cursor 74 is positioned on the function button 78 appearing on the edge of the screen 70. Then, the deciding section 56 of the control circuit 22 may replace the position data of the cursor with a value representative of the coordinates of, among the function buttons 78 represented by the coincident or approximate coordinates data, the function button 78 most remote from the cursor 74.

What is claimed is:

1. A cursor control apparatus for reading data out of a data recording medium, displaying an image represented by said data on a display, and generating image data in response to an output signal of inputting means representative of an operator's manipulation of said inputting means, said apparatus comprising:

control means for generating first image data representative of a plurality of selectable areas and second image data representative of a cursor; and displaying means for causing said first and second image data generated by said control means to be visualized on said display;

said control means including, reading means for reading the data recorded in said data recording medium, coordinates identifying means for identifying first coordinates representative of positions of the selectable areas on the basis of the data read by said reading means, direction detecting means for detecting, in response to the output signal of said inputting means, a direction in which said inputting means is manipulated and outputting direction data representative of the direction detected, deciding means for determining the first coordinates representative of a selectable area which is located in the direction detected and closest to the position of said cursor by using only said direction data received from said direction detecting means, the first coordinate data and second coordinate data representative of a position of said cursor, and for updating the second coordinates by replacing said second coordinates with determined first coordinates to produce third coordinates representative of an updated position of said cursor, said updating of the second coordinates being performed independent of a degree of manipulation of said inputting means, and cursor displaying means for generating the second image data representative of said cursor on the basis of said third coordinates received from said deciding means.

2. An apparatus in accordance with claim 1, wherein said deciding means comprises:

coordinates calculating means for calculating fourth coordinates in the direction represented by the direction data output by said direction detecting means with respect to the position of said cursor represented by the second coordinates data; and comparing means for comparing said first coordinates of said selectable areas detected by said coordinates identifying means with said fourth coordinates calculated by said coordinates calculating means, thereby detecting an area where said fourth coordinates calculated by said coordinates calculating means coincide with the first coordinates identified by said coordinates identifying means.

3. An apparatus in accordance with claim 1, wherein said deciding means comprises;

coordinates calculating means for calculating fourth coordinates in the direction represented by the direction data output by said direction detecting means with respect to the position of said cursor represented by the second coordinates data; and comparing means for comparing said first coordinates of said selectable areas detected by said coordinates identifying means with said fourth coordinates calculated by said coordinates calculating means, thereby detecting an area represented by the first coordinates which are most proximate to said fourth coordinates calculated by said coordinates calculating means.

4. An apparatus in accordance with claim 1, wherein said data recording medium stores data representative of said plurality of selectable areas and data representative of an initial position of said cursor;

said reading means reading, from said data recording medium, data representative of said plurality of selectable areas and said data representative of said initial position of said cursor;

said coordinates identifying means identifying coordinates representative of said initial position of said cursor.

5. An apparatus in accordance with claim 1, wherein said control means generates, based on the data stored in said data recording medium, the first image data representative of the plurality of selectable areas and the second image data representative of said cursor.

6. An apparatus in accordance with claim 5, wherein said data recording medium comprises an optical disk.

7. An apparatus in accordance with claim 1, wherein said cursor displaying means generates cursor data representative of said cursor and causing said cursor to appear only in a selected area of the plurality of selected areas.

8. A cursor control method for reading data out of a data recording medium, displaying an image represented by said data on a display, and generating image data in response to an output signal of inputting means representative of an operator's manipulation of said inputting means, said method comprising the steps of:

(a) reading the data recorded in said data recording medium;

(b) identifying first coordinates representative of positions of selectable areas and second coordinates representative of a position of a cursor on the basis of the data read in said step (a);

(c) detecting, in response to the output signal of the inputting means, a direction in which said inputting means is manipulated and outputting direction data representative of the direction detected;

(d) determining the first coordinates representative of a selectable area which is located in the direction detected and closest to the position of said cursor by using only the direction data, the first coordinates data and the second coordinates data;

(e) updating the second coordinates representative of said position of said cursor by replacing said second coordinates with said first coordinates determined in step (d) to produce third coordinates representative of an updated position of said cursor, said updating of the second coordinates being performed independent of a degree of manipulation of said inputting means; and (f) generating said image data representative of said cursor on the basis of said third coordinates representative of the position of said cursor and as updated in step (e).

9. A method in accordance with claim 8, wherein said step (e) further comprises the sub-steps of:

(e1) calculating fourth coordinates in the direction detected and output in said step (c) with respect to the position of said cursor represented by the second coordinates data; and (e2) comparing said first coordinates of said selectable areas detected in step (b) with said fourth coordinates calculated in sub-step (e1) and detecting an area where said fourth coordinates calculated in said sub-step (e1) are coincident with said first coordinates of a selectable area identified in step (b).

10. A method in accordance with claim 8, wherein said step (e) further comprises the sub-steps of:
(e1) calculating the fourth coordinates in the direction detected and output in said step (c) with respect to the position of said cursor represented by the second coordinates data; and
(e2) comparing said first coordinates of said selectable areas detected in step (b) with said fourth coordinates calculated in sub-step (e1), and detecting an area represented by the first coordinates which are most proximate to said fifth coordinates calculated in sub-step (e1).

11. A cursor control apparatus for reading data out of a data recording medium, displaying an image represented by said data on a display, and generating image data in response to an output signal of an input device representative of an operator's manipulation of said input device, said apparatus comprising:

control circuitry for generating first image data representative of a plurality of selectable areas and second image data representative of a cursor; and a displaying circuit for causing said first and second image data generated by said control circuitry to be visualized on said display;

said control circuitry including, a reading circuit for reading the data recorded in said data recording medium, a coordinates identifying circuit for identifying first coordinates representative of positions of the selectable areas on the basis of the data read by said reading circuit, a direction detecting circuit for detecting, in response to an output signal representative of the operator's manipulation of said input device, a direction in which said input device is manipulated and outputting direction data representative of the direction detected, a deciding circuit for determining the first coordinates representative of a selectable area which is located in the direction detected and closest to the position of said cursor by using only said direction data received from said direction detecting circuit, the first coordinates data and second coordinates data representative of a position of said cursor, and updating the second coordinates by replacing said second coordinates with determined first coordinates to produce third coordinates representative of an updated position of said cursor, said updating of the second coordinates being performed independent of a degree of manipulation of said inputting means, and a cursor displaying circuit for generating the second image data representative of said cursor on the basis of said third coordinates received from said deciding circuit.

12. An apparatus in accordance with claim 11, wherein said deciding circuit comprises;
a coordinates calculating circuit for calculating fourth coordinates in the direction represented by the direction data output by said direction detecting circuit with respect to the position of said cursor represented by the second coordinates data; and
a comparing circuit for comparing said first coordinates of said selectable areas detected by said coordinates identifying circuit with said fourth coordinates calculated by said coordinates calculating circuit, thereby detecting an area where said fourth coordinates calculated by said coordinates calculating circuit coincide with the first coordinates identified by said coordinates identifying circuit.

13. An apparatus in accordance with claim 11, wherein said deciding circuit comprises:
a coordinates calculating circuit for calculating fourth coordinates in the direction represented by the direction data output by said direction detecting circuit with respect to the position of said cursor represented by the second coordinates data; and
a comparing circuit for comparing said first coordinates of said selectable areas detected by said coordinates identifying circuit with said fourth coordinates calculated by said coordinates calculating circuit, thereby detecting an area represented by the first coordinates which are most proximate to said fourth coordinates calculated by said coordinates calculating circuit.

* * * * *